United States Patent

Lampredi

[15] 3,696,685
[45] Oct. 10, 1972

[54] TOOTHED PULLEYS
[72] Inventor: Aurelio Lampredi, Turin, Italy
[73] Assignees: Fiat Societa per Azioni; Cigala & Bertinetti S.a.s., both of Turin, Italy
[22] Filed: April 16, 1971
[21] Appl. No.: 134,778

[30] Foreign Application Priority Data
April 21, 1970 Italy......................68350 A/70

[52] U.S. Cl. ..................74/230.3, 74/230.7, 74/243, 74/443
[51] Int. Cl..............................................F16h 55/36
[58] Field of Search..74/230.1, 230.01, 230.3, 230.7, 74/409–411, 440, 443, 446, 460

[56] References Cited

UNITED STATES PATENTS

| | | |
|---|---|---|
| 3,013,440 | 12/1961 | White..........................74/443 |
| 3,076,352 | 2/1963 | Larsh...........................74/443 |
| 3,199,364 | 8/1965 | Dew ............................74/443 |
| 3,257,860 | 6/1966 | Runde et al. .................74/443 |
| 3,483,766 | 12/1969 | Erickson......................74/443 |
| 3,541,873 | 11/1970 | Wolf et al. ...................74/443 |

Primary Examiner—C. J. Husar
Attorney—Sughrue, Rothwell, Mion, Zinn & Macpeak

[57] ABSTRACT

A toothed pulley of the kind which meshes with a toothed belt in a cam-shaft drive for an internal combustion engine has a body, including a hub, moulded in plastics, with a cup-shaped metal hub reinforcement which is incorporated in the plastics material of the hub. A cavity is formed in the hub to receive a cylindrical end of a shaft to which the pulley is to be secured, the cylindrical surface of the cavity being formed by the plastics material of the hub and not by the metal hub reinforcement.

5 Claims, 2 Drawing Figures

TOOTHED PULLEYS

BACKGROUND OF THE INVENTION

This invention relates to a toothed pulley adapted to mesh with a toothed belt, particularly for the control of the cam shaft of an internal combustion engine.

This invention relates in particular to a pulley adapted to be fixed to a shaft, the hub of the pulley having a cylindrical axial bore to receive a cylindrical end of the shaft. The bottom wall of the bore has holes for receiving fixing screws and/or other means for securing the pulley to the shaft for rotation therewith.

An object of this invention is to provide a toothed pulley of the above mentioned type which is extremely economical to manufacture and which has better functional characteristics than pulleys hitherto proposed for transmission to a toothed belt.

It is known to fabricate rotary members adapted to be secured to shafts, such as gear wheels and pulleys by moulding plastics material and it is also known to incorporate in the hub of such rotary members a metal reinforcement insert having one part shaped as a socket adapted to be secured to the shaft with which the rotary member has to cooperate. The application of this known technique to the manufacture of the toothed pulleys to which this invention relates would require an expensive operation for machining the cylindrical surfaces of the socket of the metal reinforcement insert to ensure the required precision of the coupling between the shaft and the pulley and also the necessary coaxiality between the shaft and the pulley.

A further object of this invention is to provide a toothed pulley of the aforesaid type which, although manufactured in moulded plastics material and having a metal hub insert, does not require high precision in the manufacture of the socket part of the metal insert.

The pulley according to this invention is characterized in that:

a. the body of the pulley is moulded in plastics material;

b. a metal insert is incorporated in the hub of the pulley, the insert being shaped as a cup, having a base portion and a tubular portion;

c. the base portion of the metal insert forms the end wall of the cylindrical seat for the shaft, and d. the tubular portion of the metal insert is totally incorporated in the plastics material of the hub of the pulley and surrounds a cylindrical plastics portion which forms the cylindrical wall of the seat for receiving the end of the shaft.

In use of the pulley according to this invention no contact takes place between the socket portion of the metal insert and the end of the shaft inserted in the seat of the hub. Consequently the metal insert does not require to be of precision manufacture. On the other hand, the necessary precision in the size and concentricity of the cylindrical seat for the shaft is obtained by moulding the plastics material of the body of the pulley and forming the cylindrical wall of said seat in the plastics material.

BRIEF DESCRIPTION OF THE DRAWINGS

An embodiment of this invention will now be described, by way of non-limiting example, with reference to the accompanying drawings, in which.

DETAILED DESCRIPTION OF THE DRAWINGS

Figure 1:
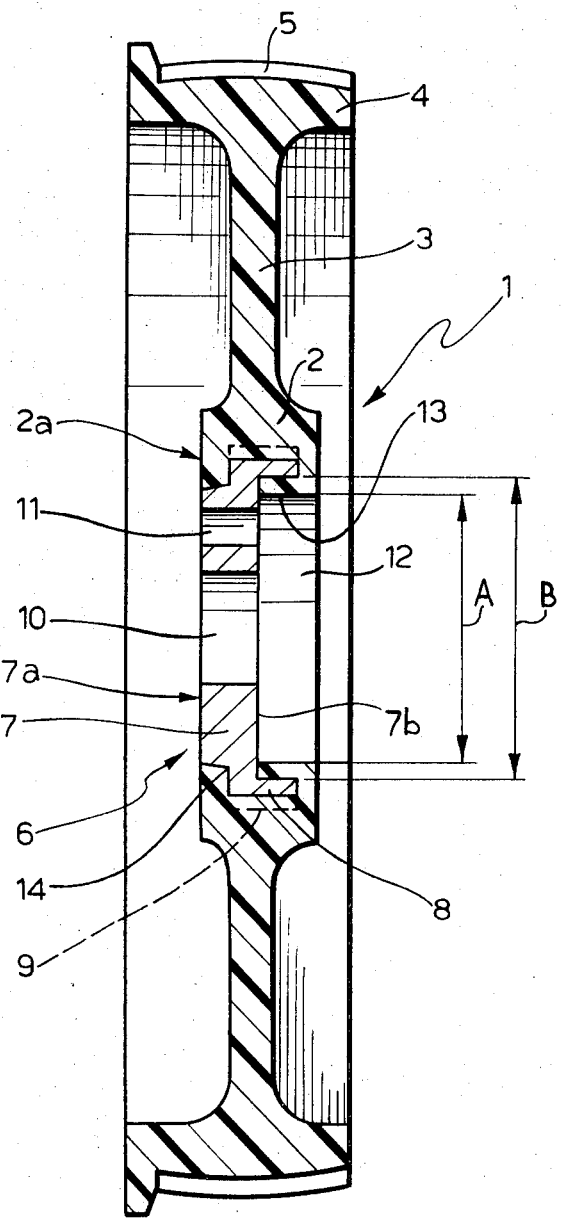
FIG. 1 is an axial section of a toothed pulley according to the invention.

In FIG. 1, reference numeral 1 indicates generally a toothed pulley for transmitting drive to a toothed belt, particularly for the control of the cam shaft of an internal combustion engine. The pulley 1 is formed by a central hub 2, an annular disc 3 and a crown 4 provided with external gear teeth 5 which are adapted to mesh with a toothed belt (not shown). The hub 2, the disc 3 and the toothed crown 4 are formed from a single moulding of plastics material, for example, a polyamide resin reinforced with glass fibers.

A metal reinforcement insert 6 is incorporated in the hub 5 during moulding of the latter. The insert 6 is cup-shaped and is formed by a disc-shaped base portion 7 surrounded by an integral tubular portion 8 which acts as a socket. The external surface of the tubular portion 8 is provided with longitudinal splines 9. The base portion 7 of the insert 6 has a central through hole 10 coaxial with the tubular portion 8 and an eccentric through hole 11 which is spaced from the hole 10.

The external surface 7a of the base portion 7 is flush with an external radial surface 2a of the hub 2, while the internal surface 7b of said base portion 7 forms the base of a central cylindrical axial cavity 12 in the hub 2. The cavity 12 forms a seat adapted to receive a cylindrical end of a shaft.

The tubular socket portion 8 of the metal insert 7 is completely inset in the hub 2 of plastics material and surrounds the cylindrical cavity 12 for a substantial part of the axial length of the latter. The internal cylindrical surface 13 of the cylindrical cavity 12 is formed in plastics during the moulding of the plastics body of the pulley, and it is therefore possible to obtain the necessary precision both in the diameter A of this surface and in its coaxiality with respect to the axis of the pulley, without the need for expensive precision machining.

There is no need, moreover, for precision in the internal diameter B or coaxiality of the tubular portion 8 of the hub insert 6, which serves solely as a hub reinforcement and does not function as a means for centralizing the pulley with respect to the shaft on which it is to be mounted.

Between the external cylindrical surface of the tubular portion 8 and the external surface 7a of the base portion 7 of the metal insert 6 an annular shoulder 14 is formed to provide improved axial support of the insert 6 in the plastics material forming the body of the pulley 1.

Figure 2:
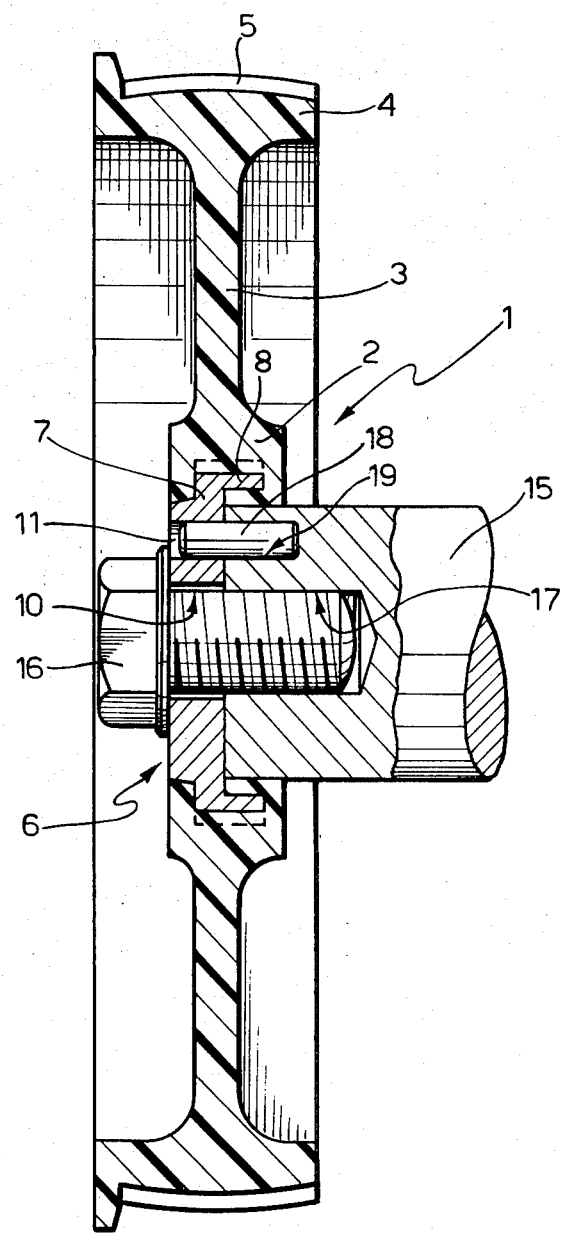
FIG. 2 illustrates the pulley of FIG. 1, in axial section, mounted on the end of a shaft, also shown partly in section.

FIG. 2 illustrates the mounting of the pulley 1 on one end of a shaft 15.

The cylindrical end of the shaft 15 fits into the cavity 12 which acts as a seat. The pulley 1 is secured to the end of the shaft 15 by a screw 16 which passes through the central hole 10 of the insert 6 and engages in a threaded axial end bore 17 in the shaft 15. A plug 18 engages in the eccentric hole 11 of the insert 7 and a corresponding blind bore 19 in the end of the shaft 15 to ensure that the pulley 1 is secured to the shaft 15 against rotation relative thereto.

It will be appreciated that details of specific embodiments of this invention can be varied widely from that which has been described and illustrated without, nevertheless, departing from the scope of this invention.

I claim:

1. A toothed pulley adapted to mesh with a toothed belt, said pulley comprising a body including a hub having means defining a cylindrical axial cavity forming a seat adapted to receive a cylindrical end of a shaft; said cavity having a bottom wall provided with holes to receive means for securing the pulley to the shaft, and further including the improvement which consists in:
   a. the body of the pulley being moulded in plastics material;
   b. a metal insert incorporated in said hub of the pulley, said insert being shaped as a cup, having a base portion and a tubular portion;
   c. said base portion of said metal insert forming the end wall of said cylindrical seat for the shaft, and
   d. said tubular portion of said metal insert being totally incorporated in the plastics material of said hub of the pulley and surrounding a cylindrical plastics portion which forms the cylindrical wall of said seat adapted to receive said end of the shaft.

2. Pulley as claimed in claim 1, wherein said tubular portion of said metal insert extends for a substantial portion of the length of the cylindrical seat for receiving the end of the shaft.

3. Pulley as claimed in claim 1, wherein the external surface of said base portion of said metal insert is substantially flush with one of the radial surfaces of said hub of the pulley.

4. Pulley as claimed in claim 1, wherein said metal insert has an annular shoulder between the external cylindrical surface of said tubular portion and the external radial surface of said base portion.

5. Pulley as claimed in claim 1, wherein the body of the pulley is moulded in polyamide resin reinforced with glass fibers.

* * * * *